United States Patent [19]
Robison et al.

[11] 3,927,832
[45] Dec. 23, 1975

[54] HORIZONTAL BOOM LIFT ARMS

[75] Inventors: William G. Robison, Alpha; Ronald D. Bieker, Jackson, both of Minn.

[73] Assignee: Ag-Chem Equipment Co., Inc., Minneapolis, Minn.

[22] Filed: July 31, 1974

[21] Appl. No.: 493,386

[52] U.S. Cl. ............................ 239/168; 239/169
[51] Int. Cl.² ................................... B05B 1/20
[58] Field of Search ........................ 239/159–170

[56] References Cited
UNITED STATES PATENTS

| | | | |
|---|---|---|---|
| 2,743,133 | 4/1956 | Badders | 239/168 |
| 3,178,145 | 4/1965 | Hein | 239/168 X |
| 3,236,456 | 2/1966 | Ackley et al. | 239/168 |
| 3,395,503 | 8/1968 | Greenburg et al. | 239/164 X |
| 3,545,678 | 12/1970 | Tangeman | 239/166 |

FOREIGN PATENTS OR APPLICATIONS

| | | | |
|---|---|---|---|
| 609,334 | 9/1948 | United Kingdom | 239/167 |

Primary Examiner—Drayton E. Hoffman
Assistant Examiner—Francis J. Bartuska
Attorney, Agent, or Firm—Orrin M. Haugen

[57] ABSTRACT

An improved spray boom positioning apparatus for an agricultural type vehicle in which hydraulically actuated devices permit the expansion, elevation and leveling of the spray booms. A unique scissor arrangement coupled to the boom frame assembly allows the booms to be closely spaced to the vehicle and serves to balance the load during vertical movement of the booms.

8 Claims, 7 Drawing Figures

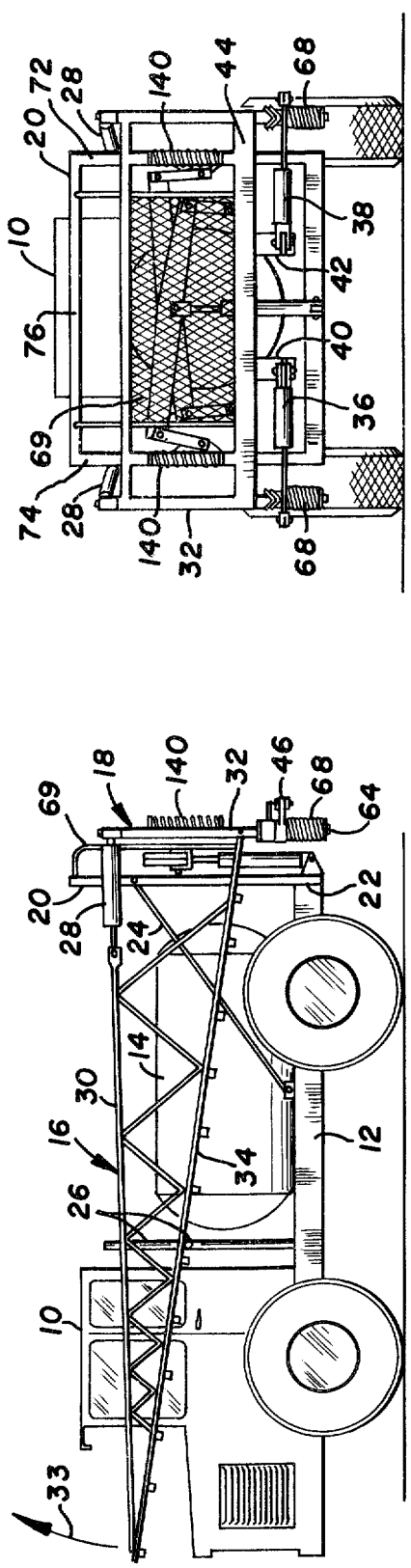
FIG.1
FIG.2
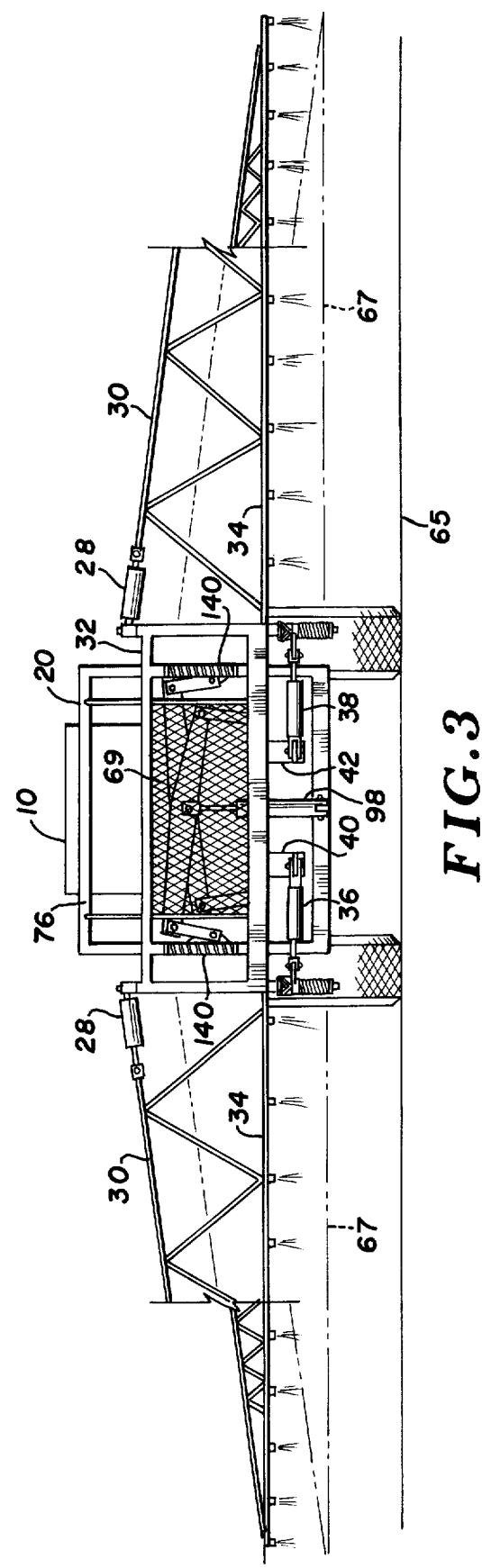
FIG.3

HORIZONTAL BOOM LIFT ARMS

BACKGROUND OF THE INVENTION

This invention relates generally to agricultural type vehicles and more specifically to a crop spraying apparatus in which a truck or other type vehicle, either self-propelled or towable, is equipped with a tank for transporting a fluid to be sprayed, the vehicle being provided with a pair of extensible booms through which the fluid to be sprayed is made to pass, thereby allowing coverage of a wide swath in a single path of the vehicle. The invention primarily resides in the novel design of the boom positioning or articulating mechanism which allows the booms and associated positioning mechanism to be closely compressed against the body of the transport vehicle when the booms are in their collapsed position.

In the past, agricultural spray vehicles have been utilized wherein the fluid to be sprayed is dispensed through a pair of extensible booms. However, these systems have not been altogether satisfactory from the standpoint of complexity of the mechanical mounting and positioning mechanisms utilized. In general, the positioning mechanism for extending and contracting, leveling, and elevating for lowering the booms to accommodate differing crop heights tend to be complex, expensive and bulky, making the vehicle somewhat cumbersome and difficult to maneuver.

SUMMARY OF THE INVENTION

In the positioning mechanism of the present invention, there is affixed to the rear of the truck body a first substantially rectangular frame member on which is adjustably mounted a pair of brackets. Linked to the brackets is a hydraulically operated scissor-type mechanism which has its opposed blades linked to a second frame member to which the spray booms are rotatably affixed. When the hydraulically operated scissor mechanism is elevated at its fulcrum, the boom frame assembly is also elevated, but because of the lever arm ratios employed, the movement of the boom frame assembly is substantially greater than the stroke of the hydraulic cylinder used to operate the scissors. Also, the scissors-type elevating mechanism serves a dual purpose of producing equal displacements of both booms in spite of loading differences which may be presented by the booms.

Because the truck-mounted frame, the linkage suspended frame and the hydraulically operated scissors mechanism are all located in a vertical plane at the rear of the truck vehicle, the boom raising-lowering mechanism may be closely coupled to the rear of the truck such that the resulting spray vehicle is more compact and easier to maneuver than known prior art arrangements.

It is accordingly the principal object of the present invention to provide an improved spray boom positioning mechanism for an agricultural type vehicle.

Another object of the invention is to provide a compact elevator mechanism for the spray booms on an agricultural type vehicle.

Still another object of the invention is to provide a rugged, yet reliable hydraulically operated boom elevator which permits a relatively short stroke hydraulic cylinder to produce a large displacement of the spray booms.

Another object of the present invention is to provide a boom elevating mechanism which produces equal displacement of the two booms, irrespective of weight differences in them.

Yet another object of the invention is to provide a spray boom elevator apparatus which may be closely oriented with respect to the body of the vehicle on which it is transported.

These and other objects of the invention will become apparent to those skilled in the art upon a study of the following specification, appended claims, and accompanying drawings.

BRIEF DESCRIPTION OF THE DRAWINGS

FIG. 1 is a side elevational view of an agricultural type vehicle showing the general orientation of the spray booms when in a retracted position;

FIG. 2 is a rear view illustrating the boom positioning apparatus with the booms compressed against the body of the vehicle;

FIG. 3 is a rear view showing the spray vehicle with the spray booms extended;

DESCRIPTION OF THE PREFERRED EMBODIMENT

Figure 4:
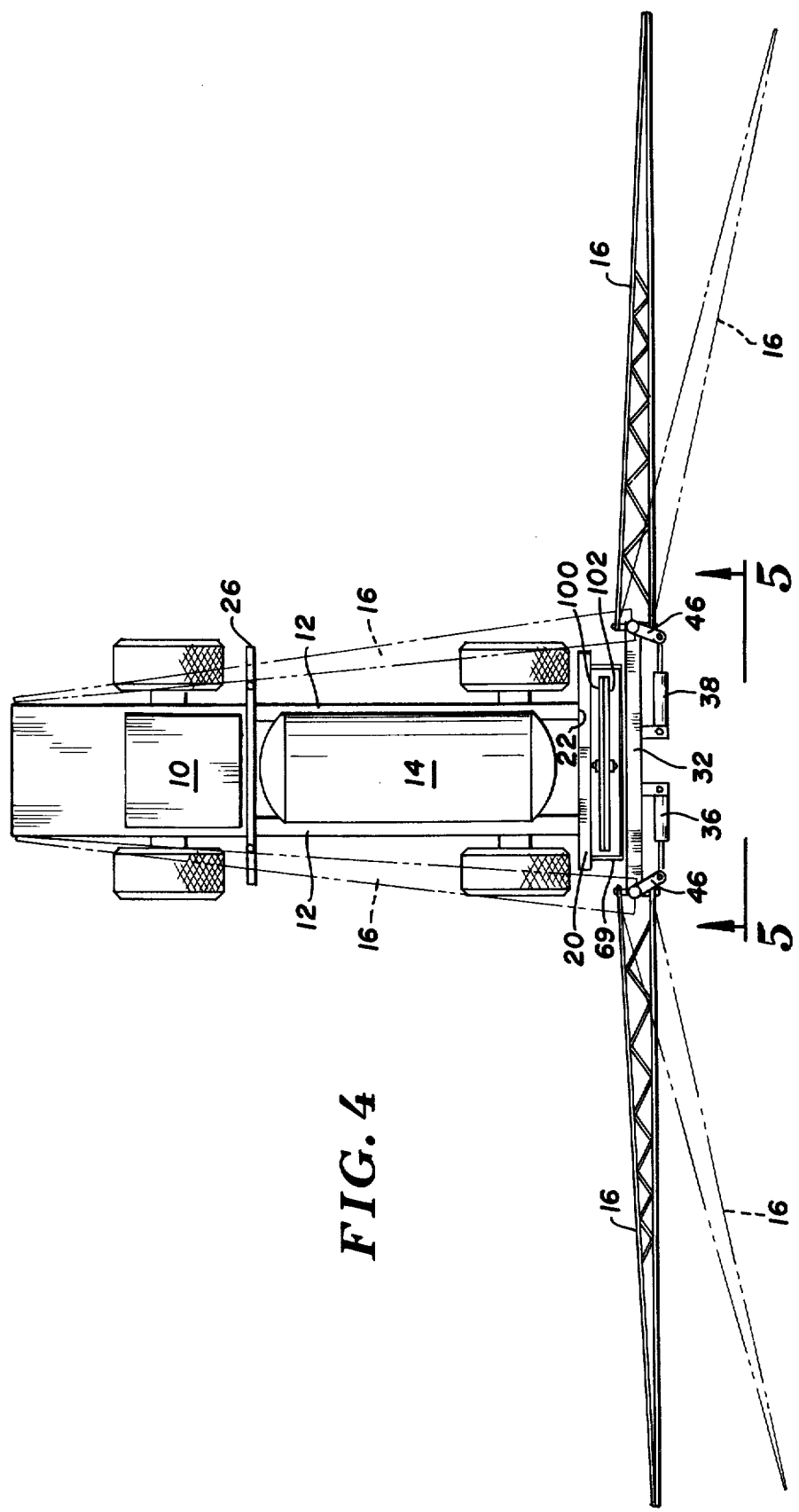
FIG. 4 is a top view of the spray vehicle showing the booms in their compressed position for transporting, their extended position for spray application and in a folded back orientation allowed by the break-away mechanism used to mount the booms.

Referring now to FIG. 1, there is shown a truck type vehicle 10 which has mounted on its bed 12 a fluid storage tank 14. The tank 14 may have a capacity anywhere in the range from 150 gallons to 750 gallons and may be fabricated from stainless steel or a suitable polymer so as to be inert to the agricultural chemicals to be stored therein. Also included, but not shown in the drawings, is a pump and associated hoses and couplings for removing the fluid to be sprayed from the tank 14 and applying it under pressure to the spray booms indicated generally by numeral 16.

Mounted at the rear of the truck bed or frame 12, is the boom positioning mechanism indicated generally by numeral 18. The manner in which the boom positioning mechanism is constructed and operated will be explained in full detail hereinbelow, but for now it is sufficient to point out that it is generally located at the rear of the vehicle and that provision is made to allow the booms 16 to fold in against each side of the body of the vehicle, which is the position employed when driving to and from the field to be treated.

The boom positioning mechanism includes a front rectangular frame member 20 which is bolted, welded or otherwise firmly attached to the truck bed 12 at point 22. A brace 24 is used to support and stabilize the upper portion of the front frame 20. When the booms are in the collapsed position shown in FIG. 1, they rest upon the horizontally extending arms of a support tee 26. A hydraulically actuated cylinder 28 is provided for coupling the upper stringer 30 of the boom 16 to the rear frame assembly 32 of the boom positioning mechanism 18. When the piston is retracted into the cylinder 28, the boom assembly is rotated upwardly in the direction of the arrow 33, allowing it to be brought to rest on the arms of the tee 26 and when the piston is forced out of the cylinder 28, the boom assembly rotates downwardly, placing the spray tube portion of the boom 34 in a generally horizontal plane.

Referring now to FIG. 2 which illustrates a rear view of the vehicle, additional features of the boom positioning mechanism 18 will be described.

In order to control the extension and retraction of the booms 16, first and second independently actuated hydraulic cylinders 36 and 38 are provided. More specifically, the cylinder portion of the hydraulic actuators 36 and 38 are connected by means of a suitable clevis and pin arrangement to downwardly extending brackets 40 and 42 which, in turn, are secured to the lower horizontal portion 44 of the rectangular rear frame member 32. The piston rods extending from the cylinders 36 and 38 are also clevis connected to a horizontally extending arms 46 (FIG. 6) on cylindrical sleeves 48 which are rotatably mounted on the vertical shafts 50, which forms the sides of the rear frame assembly 32. Thus, when the hydraulic actuator 36 or 38 is operated, the sleeve 48 is rotated about the shaft 50.

Figure 7:
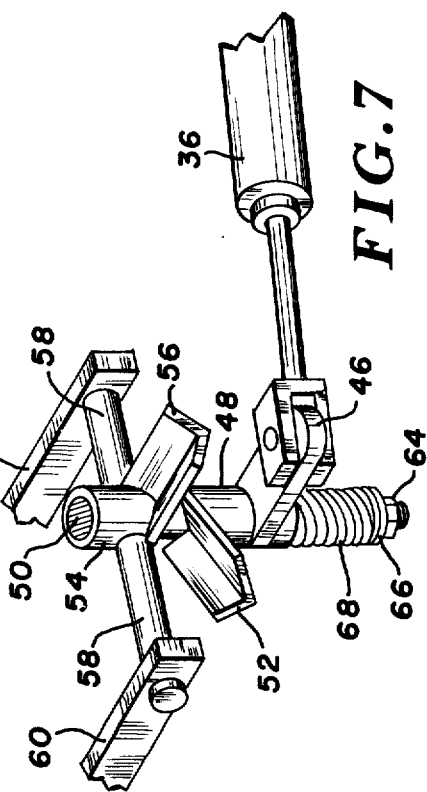
FIG. 7 is a pictorial view of the break-away mechanism used to mount the booms on the boom frame.

As shown in FIG. 7, a short length of angle iron 52 is welded to the sleeves 48 and extends outwardly therefrom in a horizontal direction with the apex of the V pointing downward. Positioned directly above the sleeve 48 and concentrically mounted for rotation on the shafts 50 are second sleeves 54 which also have a short length of angle iron 56 welded to them extending horizontally with their apex pointed downward. Also welded to the sleeves 54 are a pair of horizontally extending arms 58 to which is rotatably attached the two lower stringers 60 and 62 of the two boom assemblies 16.

A bolt 64, a washer 66 and a coil spring 68 are secured to the bottom end of the shafts 50 with the upper end of the coil springs 68 bearing against the lower end of the sleeves 48. As such, the force of the springs 68 urge the sleeves 48 upwardly so that normally the angles 52 and 56 mate, one within the other, as may be best seen in FIGS. 2 and 5. Thus, when the hydraulic actuators 36 and 38 are operated, the resulting rotation of the sleeves 48 also cause the sleeves 54 to rotate with it and carry the boom assembly therealong.

Referring now to FIG. 4 which illustrates a top view of the agricultural spray vehicle, an explanation will be given of the operation of the boom break-away mechanism. When the pistons in the actuators 36 and 38 are fully extended, the spray booms 16 will be in their retracted position, closely surrounding the body of the vehicle. During the spraying operation, the hydraulic actuators 36 and 38 are operated to retract the pistons, causing the booms 16 to assume their position at generally a right angle to the body of the vehicle. If during the spraying operation the booms should encounter an obstacle such as a fence post, stump or the like, the boom meeting the obstruction will be forced rearwardly and unless a suitable protective device is included, could be snapped off. In the present invention, the apparatus illustrated in FIG. 7 serves to obviate this problem and prevent damage to the boom. More specifically, in the event a boom strikes an obstacle, the force tending to rotate the boom will be transmitted through the arms 58 to the sleeve 54 causing it to rotate about its central shaft 50. This force will cause the angle 56 to exert a downward pressure on the angle 52, thereby depressing the spring 68 and allowing the angles 52 and 56 to become disengaged. When disengaged, the boom is allowed to swing freely to the rear. In order to resume operation, the operator must manually swing the boom toward the front until the angles 52 and 56 are again engaged.

Now that an explanation has been presented as to how the boom assemblies may be extended, retracted and leveled, consideration will next be given to the novel arrangement for raising and lowering the boom assemblies to accommodate differing crop heights encountered during spraying operations.

Figure 6:
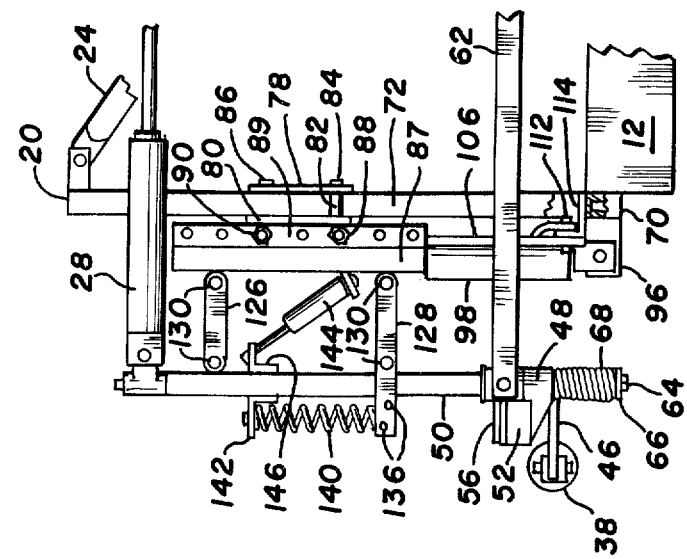
FIG. 6 is a side elevation of the mechanism of FIG. 5.
Figure 5:
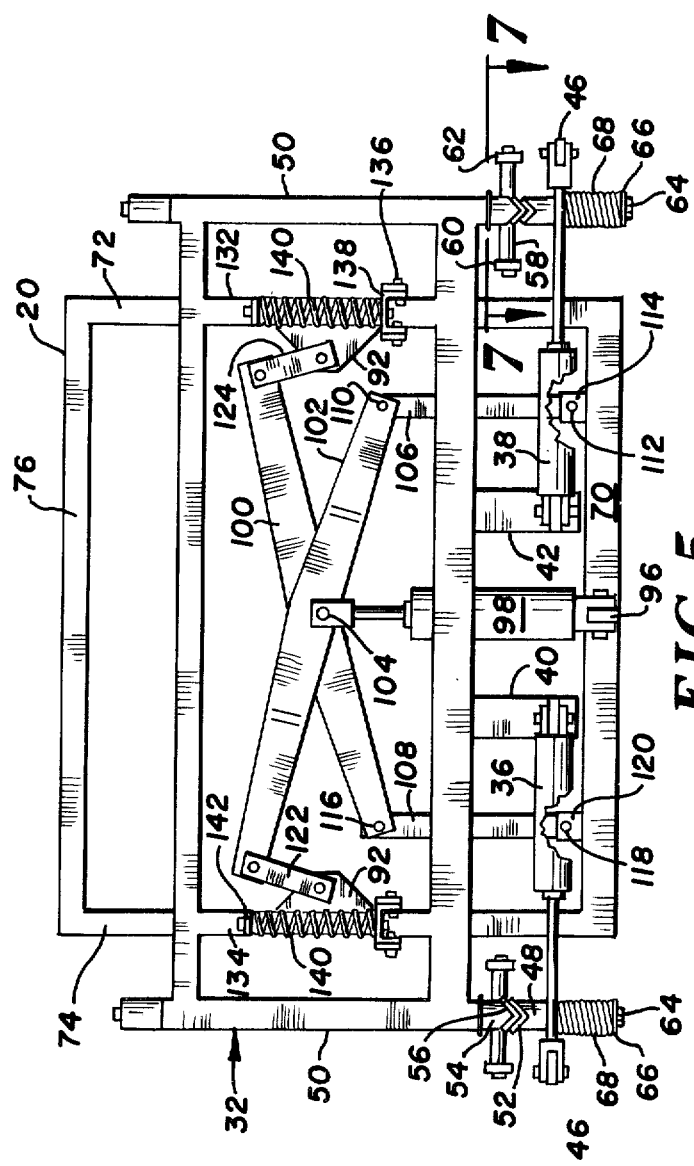
FIG. 5 is a rear view of the vehicle showing the boom positioning mechanism with the guard screen removed.

As is illustrated in FIG. 3, in order to accommodate differing crop heights, it is necessary that the operator be able to raise and lower the spray booms 30 when in their extended position. The solid line presentation illustrates the location of the booms with respect to ground 65 when elevated while the phantom lines 67 illustrate the position of the booms when in a lowered position for smaller crops. The boom elevating mechanism itself can best be seen in the rear elevation of FIG. 5 and the side elevation of FIG. 6 which show the mechanism with the guard screen 69 removed. Bolted to the truck frame 12 is the lower horizontal cross member 70 of the rectangular front frame member 20. Extending vertically upward from the horizontal frame member 70 at either end thereof are a pair of rectangular channels 72 and 74 and an upper horizontal member 76 is connected between them to complete the rectangular frame. Disposed on the front and rear sides of each of the vertically extending members 72 and 74 are metal plates 78 and 80 which are maintained in a parallel, but spaced apart relationship by means of cylindrical rollers, only one of which is shown in FIG. 6 and is identified by numeral 82. Bolts 84 and 86 pass through these rollers and serve as an axle for them. The spacing is such that the plates 78 and 80 are free to slide vertically up and down along the vertical frame members 72 and 74. The plate 80 has welded to it at right angles a short length of bar stock (not shown) having a series of holes drilled therethrough to accept a pair of bolts 88 and 90. Secured to this piece of bar stock on the plate 80 is a back boom frame mount assembly 87 in the form of a U-shaped channel having an apertured bar 89 extending outwardly at right angles from the bottom of the U. Thus, the bolts 88 and 90 passing through the bar stock on plate 80 also passed through selected holes in the bar 89. As such, the plates 78 and 80 as well as the boom frame mount assembly 87 are free to slide up and down along the vertical frame members 72 and 74. Also secured to the boom frame mount assembly 87 by the bolts 88 and 90 are brackets 92 (FIG. 5).

Located midway between the vertical frame members 72 and 74 on the lower horizontal cross piece 70 is a rearwardly extending bracket 96 adapted to receive a clevis type coupling on the hydraulic actuator 98. At the end of the piston rod of the actuator 98 is a second clevis into which is inserted first and second scissor members 100 and 102. A pin 104 passes through the piston rod clevis and through central apertures in the scissor members, this pin serving as a fulcrum. Connected between the lower ends of the scissor members 100 and 102 and the lower horizontal portion 70 of the front frame 20 are linkages 106 and 108. More specifically, link 106 is connected to the lower end of scissor member 102 by a pin 110 which passes through both elements and permits rotation of these two elements with respect to one another. The link 106, in turn, has its lower end coupled by means of a pin 113 to an upstanding angle 114 which is welded to the frame member 70. The link 108 is similarly coupled by pins 116 and 118 to the lower arm of scissor member 100 and to an upstanding angle 120 also welded to the frame member 70.

The upper arms of scissor members 100 and 102 are coupled to the brackets 92 by means of short links 122 and 124, the connections again being made by pins passing through suitable apertures in the brackets 92 and the upper scissor arms such that rotational motion between the links and arms can be achieved.

It can be seen, then, that when the hydraulic actuator 98 is operated to move the piston upwards, the fulcrum of the scissors 104 will be moved upward, but because the links 106 and 108 prevent the lower arms of scissor members 100 and 102 from moving upward (only rotation is permitted) the upper arms will move upward, causing the back frame slide assembly 87 to slide upwards along the vertical frame members 72 and 74. Similarly, when the piston of the hydraulic actuator 98 is lowered, the scissor action will cause the member 87 to slide downward along the vertical members 72 and 74.

In order to couple the sliding motion of the members 87 to the boom frame assembly 32, there are provided first and second linkages 126 and 128 which are in the form of flat metal straps, each having a pair of cylindrical pins welded thereto and extending outwardly therefrom at right angles, the pins being spaced apart from one another by a predetermined distance. The pins on the linkage straps 126 and 128 pass through short tubes 130 which are welded across the open end of the U-shaped channel of slide members 87 and short tubes welded to the vertical struts 132 and 134 of the movable frame assembly 32 to which the booms are attached. The pins also pass through a pair of retainer plates (not shown) which prevents these linkages from working outward from their mating tubes.

Sandwiched between the linkage strap 128 and its associated retainer plate and held in place by bolts 136 is a U-shaped bracket member 138 (FIG. 5) to which is affixed the lower end of a coil spring 140. The other end of the spring 140 is bolted to an angle member 142 which is welded to the vertical struts 132 and 134. The springs 140 normally urge the end of the lower linkages 128 downward and the slide members 87 upward. Cooperating with the spring 140 is a shock absorber 144 which has one end affixed to the slide members 87 and the other end affixed to an angle 146 welded to the back side of the vertical struts 132 and 134 of the boom frame assembly 32.

In operation, to raise the booms to adjust for differing crop heights, the operator energizes the hydraulic cylinder 98 causing the piston thereof to move upward, displacing the fulcrum 104 of the scissor members 100 and 102 upward. As was earlier described, this action causes the assembly including the rollers 82, the plates 78 and 80 and the slide assembly 87 to slide upwards along the vertical struts 72 and 74 of the frame 20. The movement of this last mentioned assembly upwards results in a corresponding upwards movement of the boom frame assembly 32 through the linkage plates 126 and 128. Similarly, when the piston of cylinder 98 is lowered, the scissor action of members 100 and 102 causes the assembly 87 to move downwards, pulling the boom frame assembly in a downwards direction. The scissor arms 100 and 102 and the linkages 106, 108, 122 and 124 are so dimensioned that a relatively small displacement of the fulcrum 104 results in a relatively large displacement of the slide members 87 and of the boom frame 32 attached to these slide members.

By utilizing the scissor arrangement illustrated rather than two independent hydraulic cylinders for moving the two slide assemblies 87, it is insured that the two booms will be raised and lowered in unison independent of differing weights thereof. Thus, the scissor mechanism compensates for differing load variations, insuring smooth and reliable motion.

As the vehicle moves across rough terrain, the spring 140 and shock absorber 144 serve to dampen the bounce which would otherwise occur in the boom frame assembly 32.

It is also to be noted that a course adjustment in the distance between ground and the lower springer 34 of the extended booms may be made by selecting the positions that the brackets 92 are bolted to the slide bracket 87. In the view of FIG. 6, the bracket is shown as being bolted midway along the member 87. However, by choosing alternate hole positions for the bolts 88 and 90, the brackets 92 will be of differing distance from the ground.

While a preferred embodiment of the invention has been illustrated and described, variations thereof will become apparent to those skilled in the art and hence, the scope of the invention is to be determined from the appended claims.

We claim:

1. In an agricultural spray type vehicle of the type including a vehicle having mounted thereon a fluid reservoir and a pair of booms which may be extended from said vehicle at right angles by rotation about a vertical axis at the inner end thereof for dispensing the fluid in said reservoir over a given area, a boom positioning mechanism comprising:
    a. first and second frame members, said first frame member being fixedly attached to the rear of said vehicle and having first and second vertical struts displaced on either side of the center of said vehicle by a predetermined distance, said second frame member having said booms mounted thereon; said second frame member comprising:
        1. first and second cylindrical shafts held together in a vertical, parallel and spaced apart relationship by first and second horizontal cross members;
        2. first and second cylindrical sleeve members disposed on the lower ends of each of said first and second shafts;
        3. means connecting said booms individually to said first cylindrical sleeve on said first and second shafts; and
        4. means for imparting a rotational motion to said second cylindrical sleeve on sai first and second shafts;
    b. first and second slidable means mounted on said first and second vertical struts for vertical reciprocating motion therealong;
    c. a scissors mechanism having first and second arms pivoting about a generally centrally disposed pivot shaft forming a fulcrum;
    d. means pivotally connecting the outer end of each of said arms respectively to said first and second slidable means and the opposed inner ends of each of said arms being pivotally anchored to said first frame member at a pivot anchor point;

e. linkage means coupling said first and second slidable means to said second frame member;

f. means coupled to said pivot shaft for simultaneously moving said first and second arms for substantially equal arcuate distances in a vertical direction and plane about said inner pivot anchor point;

g. third and fourth cylindrical sleeve members individually disposed on the upper ends of said first and second cylindrical shafts; and h. linear motion producing means coupling said third and fourth sleeve members to said booms.

2. Apparatus as in claim 1 wherein said means for moving said first and second arms in a vertical direction comprises a hydraulically operated piston coupled between said pivot shaft and said first frame member.

3. Apparatus as in claim 1 and further including shock absorber means disposed between said slidable means and said second frame member.

4. Apparatus as in claim 1 wherein said scissor arms pivot about a pivot shaft forming a fulcrum oriented along a horizontal axis.

5. Apparatus as in claim 1 wherein said means for imparting rotational motion comprises:

a. an arm attached to said second cylindrical sleeves and extending outwardly therefrom; and b. first and second hydraulic cylinders coupled between said arms attached to said second cylindrical sleeves and said first horizontal cross member.

6. Apparatus as in claim 1 wherein said vehicle is a self-propelled motor vehicle.

7. Apparatus as in claim 1 being particularly characterized in that detent means are provided coupling said first and second cylindrical sleeve members on each of said first and second shafts.

8. In an agricultural spray apparatus of the type including a vehicle having a fluid reservoir mounted thereon and a pair of booms which may be rotatably extended about a generally vertical axis from said vehicle for dispensing the fluid in said reservoir over a given area, a boom elevating mechanism comprising:

a. a first frame having first and second vertical members fixedly attached to the rear of said vehicle on opposite sides of the center line of said vehicle;

b. a second frame having a pair of extensible booms coupled thereto positioned rearward of said first frame with respect to said vehicle, said second frame comprising:

1. first and second cylindrical shafts held together in a vertical, parallel and spaced apart relationship by first and second horizontal cross members;

2. first and second cylindrical sleeve members disposed on the lower ends of each of said first and second shafts;

3. means connecting said booms individually to said first cylindrical sleeve on said first and second shafts; and 4. means for imparting a rotational motion to said second cylindrical sleeve on said first and second shafts;

c. coupling means slidably engaging said first and second vertical members on said first frame and coupled to said second frame;

d. means including a pair of lifting arms pivotally anchored at their respective inner ends to said first frame and each being coupled at their respective outer ends to one of said pair of extensible booms;

e. means for simultaneously displacing said coupling means substantially equal distances in a vertical direction;

f. third and fourth cylindrical sleeve members individually disposed on the upper ends of said first and second cylindrical shafts; and g. linear motion producing means coupling said third and fourth sleeve members to said booms.

* * * * *